United States Patent
Huey

[15] 3,667,123
[45] June 6, 1972

[54] DENTURE AND METHOD

[72] Inventor: Elbert P. Huey, Scottsdale, Ariz.
[73] Assignee: Comfo-Dent Corporation
[22] Filed: July 31, 1970
[21] Appl. No.: 59,922

[52] U.S. Cl. ...................................................... 32/2
[51] Int. Cl. ................................................. A61c 13/00
[58] Field of Search ................................................ 32/2, 8

[56] References Cited

UNITED STATES PATENTS

| | | | |
|---|---|---|---|
| 2,778,110 | 1/1957 | Gooris | 32/2 |
| 3,226,826 | 1/1966 | Town | 32/2 |
| 3,241,238 | 3/1966 | Kersten | 32/2 |
| 3,083,459 | 4/1963 | McMurry et al. | 32/2 |

*Primary Examiner*—Robert Peshock
*Attorney*—Drummond, Cahill & Phillips

[57] ABSTRACT

A prosthetic denture and method of manufacture and self-fitting comprising a rigid U-shaped frame bonded into notches in bases of a set of artificial teeth; a deformable metal mesh forming a plate structure for said set of teeth; a soft elastomeric material encapsulating said mesh and bonding it to said set of teeth to form a deformable plate structure, whereby a self-fitting method for installing said set of teeth comprises the coating of said plate structure with uncured elastomeric material, then placing said prosthetic denture in a persons oral cavity and deflecting said deformable plate structure into a set accurately conforming condition with an edentulus ridge in said cavity and allowing said last-mentioned elastomeric material to cure in said accurately conforming condition.

2 Claims, 7 Drawing Figures

INVENTOR.
ELBERT P. HUEY
BY
Drummond, Cahill & Phillips
ATTORNEYS

3,667,123

DENTURE AND METHOD

BACKGROUND OF THE INVENTION

In accordance with the prior art, it has been recognized that prosthetic dentures may be self-fitted by a patient. Various methods for accomplishing this result include the use of thermosetting resinous material which may be used to coat a prosthetic denture before inserting in the mouth for self-fitting and this process has been somewhat unsatisfactory due to the exothermal reaction effects which tend to irritate or burn the mucous membranes in the mouth.

Furthermore, prior art prosthetic dentures used for self-fitting purposes have included plate structures which are substantially glass hard and are therefore difficult to reshape and refit in accordance with the progressive changes which occur in the contours and dimensions of oral tissues.

It has been apparent to persons practicing in the dental profession that a patient is not ordinarily capable of handling a hard setting plastic material in the mouth for final fitting of a prosthetic denture and accordingly, prior art attempts to utilize such materials have resulted in injury to the mucous membrane areas of the patient's mouth due to exothermal reactions of the hard setting plastic materials during the final fitting of such materials to the arches and ridges of a patient's oral cavity.

The prior art includes self-fitting dentures and methods wherein a pair of artificial dentures are installed by the patient in his mouth in connection with an alignment plate. However, alignment plates are difficult to handle without substantial experience and therefore most patients are not capable of utilizing an alignment plate in order to properly install the upper and lower prosthetic dentures relative to each other.

SUMMARY OF THE INVENTION

In accordance with the present invention, artificial dentures are constructed by providing artificial teeth with open notch portions disposed in opposed relation to the bite portions of such artificial teeth and a rigid frame member is installed and bonded in the notch portions of the artificial teeth to hold them in a rigid assembled condition. Then the set of teeth so assembled with the frame member are placed in a mold and a deformable mesh structure is placed in the mold together with an uncured resin so as to bond the artificial teeth and the deformable mesh structure together whereby an artificial denture is produced which may then be coated with an additional layer of uncured resin and placed in a persons oral cavity and deformed and deflected into closely fitted relationship with an edentulus ridge therein whereupon the last-mentioned resin coating may be allowed to cure and to thereby attain a very close fitting accurate conformance with the edentulus ridge of the oral cavity. The artificial denture of the invention comprises a deformable mesh structure encapsulated in a soft rubber-like elastomeric material which has resilient character whereby deflection of the mesh structure is capable of holding the resilient elastomeric material in deflected position and into close conformity with an edentulus ridge in a patient's mouth whereby a final fitting of the artificial denture may be accomplished by utilizing additional uncured elastomeric material on the artificial denture for final fitting purposes in the patient's mouth.

The invention also comprises the production of a pair of artificial denture plates having a 4½ inch curve of spee which obviates the necessity of attempting to utilize an alignment plate which a patient is not ordinarily capable of handling properly. The 4½ inch curve of spee will allow the patient accurately to fit a pair of dental plates so that the mandible may be moved in any normal direction without cuspal interference. In a preferred embodiment, teeth with inverted cusps are employed, so as to eliminate any problem of cuspal interference.

The elastomeric material used in accordance with the present invention is not exothermal in its curing process and therefore may be used in the mouth with complete comfort in connection with artificial dentures for final fitting or corrective fitting as desired. Additionally, the elastomeric material utilized in accordance with the invention may allow the patient to self-fit dentures and then trim them and/or re-fit them from time to time as desired.

The invention comprises a novel combination of a rigid frame for holding a plurality of artificial teeth in proper disposition relative to each other and a deformable metal mesh structure bonded thereto by means of a soft resilient elastomeric material whereby the metal mesh may be deflected to a set condition and may have sufficient set strength to hold the resilient elastomeric material in deflected position so that fitting of the artificial denture of the invention to a person's mouth may be accomplished by deforming and deflecting the plate structure thereof into close conformity with a great variety of configurations as may be found in various persons oral cavities and whereby a minimal variety of artificial dentures may be thus manufactured to satisfy the demands of the general public.

Accordingly, it is an object of the present invention to provide a novel prosthetic denture and methods of manufacture and self-fitting.

Another object of the invention is to provide a prosthetic denture having novel deformable structure particularly adapted for use in self-fitting of such dentures by a patient.

Another object of the invention is to provide a prosthetic denture having novel deformable structure adapted to fit a great variety of configurations and which may readily be fitted in accordance with a method of the invention by tuilizing a non-exothermal elastomeric material which may readily and comfortably be cured in the patient's mouth without damaging the mucous membranes therein.

Another object of the invention is to provide a prosthetic denture as an article of manufacture which has normal structural features including artificial teeth having notched portions in which a rigid frame is bonded and which supports the artificial teeth in such a manner that a readily deformable and resilient soft plate structure may be utilized for deflection fitting to the features of a persons oral cavity.

Another object of the invention is to provide novel methods of manufacture and fitting of a prosthetic denture so that such dentures may be self-fitted very accurately, comfortably and efficiently.

Another object of the invention is to provide a prosthetic denture having a pliable soft base made of a silicone polymer which may readily be deformed, trimmed or added to as desired.

Further objects and advantages may be apparent from the following specification, appended claims and accompanying drawings.

DESCRIPTION OF THE PREFERRED EMBODIMENTS

Figure 1:
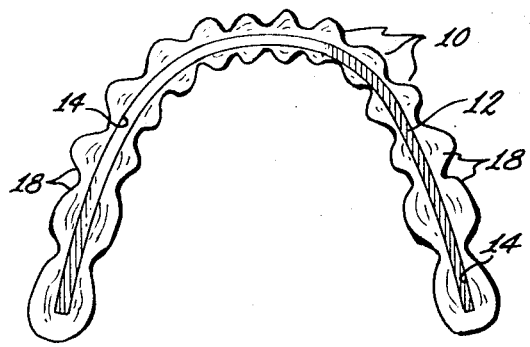
FIG. 1 is a view of a rigid, substantially U-shaped frame of the invention set and bonded into open notch portions of a set of artificial teeth.

As shown in FIG. 1, a mandibulary or maxillary set of artificial teeth 10 are assembled in connection with a substantially U-shaped metal frame 12. This metal frame is generally U-shaped to match the usual edentulus ridge of a patient's mouth. The artificial teeth 10 as shown in FIGS. 2, 4, 6, and 7, are all provided with open notch portions 14 in which the frame 12 is disposed. The artificial teeth 10 are all provided with bite portions 16 adapted for occlusion and are provided with base portions 18 in which the notch portions 14 are disposed. The notch portions 14 are all open at said base portions 18 so as to permit the artificial teeth 10 readily to be installed on the frame 12.

The frame 12 is preferably made of a high tensile strength material such as work hardened stainless steel or the like and as shown in FIGS. 2, 4, 6, and 7, this frame member 12 has a vertical dimension or depth greater than its breadth to provide for cross-sectional rigidity in a substantially vertical direction and the cross-section is thus greater in a direction toward the bite and base portions 16 and 18 than it is in a direction laterally thereof.

The teeth 10 shown on the frame 12 in FIG. 1 of the drawings are bonded to the frame 12 by an epoxy or any other suitable cement or bonding agent which will hold the teeth rigidly in connection with the frame 12.

Figure 2:
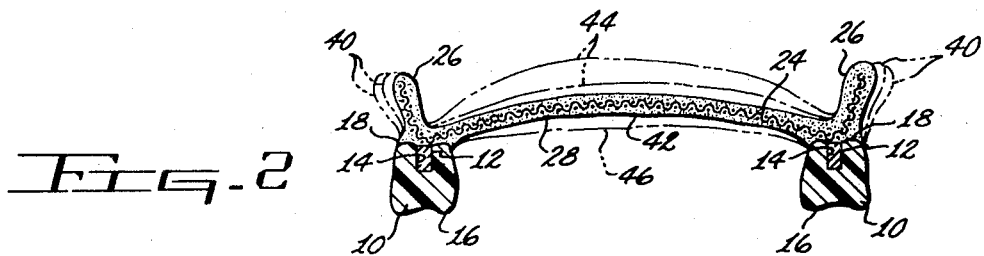
FIG. 2 is a cross-sectional view of a prosthetic denture manufactured in accordance with the present invention.
Figure 4:
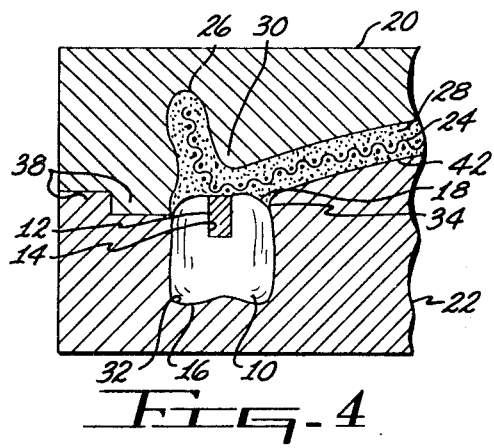
FIG. 4 is a cross-sectional view of a mold showing an artificial denture of the invention therein and as produced in accordance with the method of the invention.

In accordance with a method step of the invention, a deformable mesh structure together with the artificial teeth 10 and the frame 12 are disposed in cavities formed by a pair of mold blocks 20 and 22 as shown in FIG. 4 of the drawings. The mesh structure 24 is disposed over the frame 12 and is extended upwardly therefrom to form a skirt structure 26 and an elastomeric material together with a curing agent designated 28 is introduced into the cavities of the mold blocks 20 and 22 to encapsulate the mesh structure 24 whereupon the elastomeric material 28 is allowed to cure and to thereby form an artificial denture such as shown in FIG. 2 of the drawings. The mold block 20 is provided with a ridge portion 30 similar to an edentulus ridge of a patient's mouth.

Figure 6:
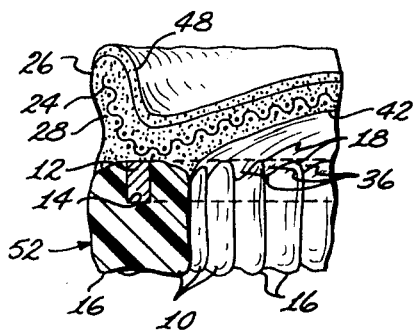
FIG. 6 is an enlarged fragmentary cross-sectional view of a complete maxillary prosthetic denture of the invention after final fitting and in accordance with the final fitting methods of the invention.
Figure 7:
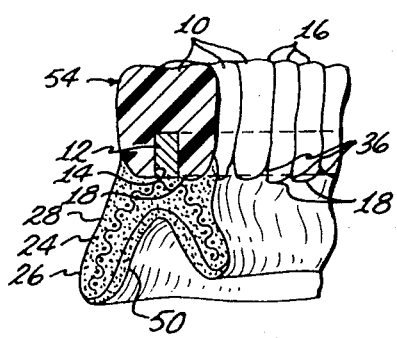
FIG. 7 is an enlarged cross-sectional view of a mandibulary prosthetic denture of the invention after final fitting in accordance with the methods of the invention.

The mold block 22 is provided with cavities 32 which are cast on the artificial dentures 10 and the block 22 is provided with recesses 34 into which the elastomeric material 28 may flow before it cures. These recesses 34 are located between the teeth and are similar to the usual natural gums in shape so as to produce intermediate artificial gum portions 36 as shown in FIGS. 6 and 7. It will be understood that the mold blocks 20 and 22 may be made of disposable plaster and are provided with overlapping index ledges 38 as shown in FIG. 4, to insure that the molds are in proper registry when the elastomeric material 28 is being cured to encapsulate the mesh structure 26 and bond it to the frame 12 and artificial teeth 10.

Figure 5:
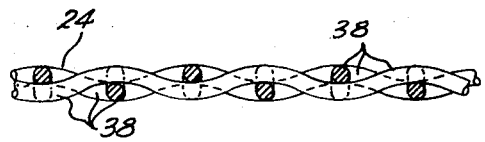
FIG. 5 is an enlarged fragmentary cross-sectional view of the formable mesh structure used in the deformable plates of the invention.

The mesh structure 24 as shown in FIG. 5 of the drawings, on enlarged scale, comprises interwoven wires 38 which are all undulated and thus capable of being somewhat straightened during deformation of the mesh structure 24.

The mesh structure 24 is preferably made of high tensile strength material such as stainless steel or other wire which when deflected or deformed to a set position will have considerable set strength as will be hereinafter described in detail.

As shown in FIG. 2, an article of manufacture in accordance with the present invention and method is disclosed. This article of manufacture is an artificial denture as produced in the mold blocks 20 and 22 shown in FIG. 2 of the drawings. This artificial denture as shown in FIG. 2, is adapted for use in fitting an edentulus ridge in the maxillary area of a patient's mouth and the elastomeric material 28 is soft, pliable and resilient while the mesh structure 24 is capable of being set in a deformed position from that as shown in FIGS. 2 and 4, so as to hold the resilient, soft, elastomeric material 28 in any desired set position to conform with the edentulus ridge area of a human oral cavity.

As shown in FIG. 2 of the drawings, the skirt portion 26 as described in connection with FIG. 4 of the drawings, may be deflected to various set positions as indicated by broken lines 40, and the palate engaging portion 42 of the artificial denture is adapted to be deflected and deformed into close proximity with the palatal vault in the maxillary area of a human oral cavity. It will be seen that this portion 42 may be deflected upwardly into various broken line positions 44 or downwardly into a broken line position 46 depending upon the geometry of the palatal vault of a given patient. When the skirt portions 26 or the palate engaging portion 42 are deflected and deformed into a set position as indicated by any one of the broken line positions 40, 44, or 46, the wire strands 38 of the mesh structure 24 may be slightly straightened or deflected so as to accommodate the variation in curve geometry and thus the mesh 24 is capable of holding the elastomeric material 28 in a set disposition in close conformity with the geometry of the respective oral cavity.

Accordingly, it will be appreciated that the method step as shown in FIG. 2 by broken lines, comprises the deflection and deforming of the mesh structure and its encapsulating elastomeric material 28 so as to conform closely with a maxillary or mandibular edentulus ridge area of an oral cavity and as shown in FIGS. 6 and 7, additional layers of elastomeric material are designated 48 and 50 respectively. These layers of elastomeric material 48 and 50 are placed on the respective maxillary and mandibular dentures produced in accordance with the molding method as shown in FIG. 4 of the drawings, and are then inserted in the oral cavity and deformed into close conformity therewith as shown in FIG. 2 of the drawings. The layers of elastomeric material 48 and 50 include uncured material and a suitable curing agent. Accordingly, it will be appreciated that the elastomeric material forming the layers 48 and 50 very accurately conforms with the features of the maxillary and mandibulary areas when the mesh structure 24 and primary elastomeric material 28 are deflected into close conformity with the respective areas of the oral cavity. Deformation of the mesh structure 28 may be accomplished by a person's fingers so that the artificial denture of the invention may be self-fitted when the layers of elastomeric material 48 and 50 are placed on the dentures and the dentures are then located in the oral cavity in their respective position.

Figure 3:
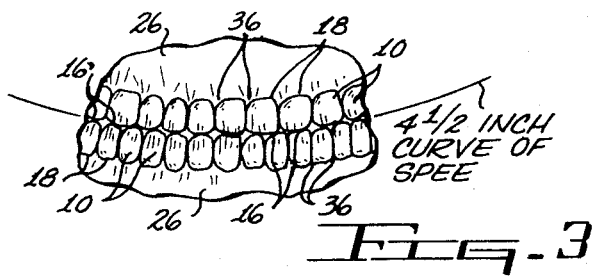
FIG. 3 is a side elevational view of a pair of artificial dentures shown in relation to each other and disposed on approximately a 4½ inch curve of spee.

As shown in FIG. 3 of the drawings, the respective maxillary and mandibulary artificial dentures 52 and 54 are provided with a 4½ inch of spee so that the patient may readily install the artificial dentures 52 and 54 in their respective positions such that the patient will readily be able to move the mandible in any direction without cuspal interference. Accordingly, the artificial dentures 52 and 54 may readily be installed without using any alignment plate or other alignment device. It will be appreciated by those skilled in the art that the desired 4½ inch curve of spee may be predetermined by setting the artificial teeth 10 in connection with the frame 12 which may also be properly curved to conform or match the 4½ inch curve of spee so as to allow facility in the manufacture of the dentures 52 and 54 to easily and accurately attain the desired geometry including the 4½ inch curve of spee.

It will be noted that the elastomeric material 28 and the elastomeric material of the liner portions 48 and 50 is soft, resilient material and preferably such as the Medical Silastic 382 Elastomer manufactured by the Dow Corning Corporation, Midland, Mich., in accordance with their bulletin 14-004 dated May, 1963. Stannous octoate is used as a curing agent for the Silastic 382 elastomer.

This soft elastomeric material readily bonds to a previously cured portion of the same material so that the elastomeric material 28 as formed in the mold blocks 20 and 22 readily receives the liner portions 48 and 50 of the maxillary and mandibulary artificial dentures at a time when the dentures are fitted in the respective areas of the human oral cavity.

The denture as shown in FIG. 2 and the corresponding mandibulary denture may be produced in a standard size and the only difference in the standard artificial denture will be the six anterior artificial teeth. Accordingly, the customer or patient purchasing artificial dentures as produced in accordance with the invention, may readily pick from a minimum of sizes, a set which most resembles the teeth that they originally had, namely, the six anterior teeth.

It has well been established that 95 percent of men's and women's molar teeth are two inches apart and, accordingly, the U-shaped spread of the frame 12 is substantially two inches at the rear area thereof. The frame 12 holds the teeth in solid rigid assembly relative to each other and the base, including the elastomeric material 28, is soft and pliable and this material together with the mesh 24 can be formed accurately in the oral cavity with the digital finger of the patient so that the artificial dentures of the invention may readily be self-fitted. Accordingly, the artificial dentures are held in place relative to the 4½ inch curve of spee hereinbefore described and the uncured elastomeric material 48 and 50 hereinbefore described may be applied and installed by the person when self-fitting the dentures of the invention. Vertical dimensions of the artificial dentures of the invention may be readily adjusted by adding or removing portions of the pliable elastomeric material 28. The artificial denture of the present invention with its soft, pliable elastomeric material 28 and liner portions 48 and 50 will be very comfortable to the respective areas of the oral cavity and may be added to as time goes on since these areas change over the years and due to the fact that the particular elastomeric material hereinbefore identified does not have any exothermal curing reaction, it is very comfortable at all times during self-fitting operations and/or additions and changes which may be made from time to time. The elastomeric material 28 and the liner portions 48 and 50 are capable of being trimmed with scissors and thus alterations for fitting may be made by the patient as desired.

It will be appreciated that the method of the invention for self-fitting artificial dentures is a continuation or extension of the method for manufacturing the same dentures and therefore the artificial dentures are initially produced by bonding the artificial teeth 10 to the frame 12 which is subsequently placed in the mold blocks 20 and 22 together with the mesh 24 and uncured elastomeric material 28 and its respective curing agent. This elastomeric material is then allowed to cure in the mold blocks 20 and 22 whereupon the article of manufacture is complete. However, following these method steps and continuing therefrom, the method step of coating the artificial dentures with a liner material such as the liner 48 and 50 includes the placement of the uncured elastomeric material and its curing agent to form the liners 48 and 50 whereupon the dentures are placed in the respective areas of an oral cavity. Then, the elastomeric material 28 which is already cured and which encapsulates the mesh 24 is deflected until the mesh 24 is in set position in close conformity with the respective maxillary and mandibulary edentulus ridges. The mesh 24 thus has substantial set strength for holding the resilient elastomeric material 28 in close conformity with the respective features of the oral cavity and during this time the elastomeric material layers 48 and 50 cure into close conformity with the respective features of the oral cavity and the method of self-fitting is complete.

The hereinbefore described method readily provides for the use of the article of manufacture shown in FIG. 2 of the drawings by a patient for self-fitting of artificial dentures in accordance with the self-fitting method and structure hereinbefore described in connection with FIGS. 2 3, 6, and 7 of the drawings.

It will be obvious to those skilled in the art that various detail modifications of the invention may be resorted to without departing from the spirit of the invention.

I claim:

1. As a new article of manufacture, a self-fitting prosthetic denture device comprising:
   a. a rigid U-shaped metal frame;
   b. artificial teeth rigidly affixed to and held in dentally operative position by said rigid U-shaped metal frame; and
   c. a semi-rigid resilient thermally deformable base material bonded to said rigid U-shaped frame - artificial teeth assembly, forming a semi-rigid resilient ridge-engaging portion to be thermally deformed to close conformance with the edentulus ridges of a person's mouth, said semi-rigid base material being deformable at a temperature above body temperature but below a temperature which would injure the person's oral tissues, such that when said self-fitting denture is heated to said deforming temperature and placed within the person's mouth, the semi-rigid resilient material can be readily deformed by finger pressure to cause said semi-rigid resilient material to conform with said edentulus ridges and, upon cooling to body temperature, said deformed semi-rigid resilient material holds said denture device in dentally operative position within said person's mouth, with said teeth being rigidly supported by said frame.

2. A method for manufacturing and self-fitting a set of prosthetic dentures comprising:
   a. preparing a set of artificial teeth;
   b. rigidly affixing said teeth to a generally U-shaped rigid metal member to hold said teeth fixed and supported in dentally operative position by said rigid frame;
   c. placing said frame - teeth assembly in a mold with uncured elastomeric thermoplastic material;
   d. curing said elastomeric thermoplastic material to a rubbery consistency around said frame - teeth assembly to form a self-fitting prosthetic denture having a thermoplastically deformable base shaped generally to engage the edentulus ridges of the person's mouth;
   e. preheating said thermoplastic elastomeric material to a deforming temperature higher than body temperature but lower than a temperature which would injure the person's oral tissues;
   f. placing said frame-teeth-elastomer assembly into the person's mouth and deforming said elastomeric material while at said deforming temperature with finger pressure to closely conform to and engage said edentulus ridges of the person's mouth; and
   g. cooling said deformed assembly to at least body temperature, such that said teeth are positioned within said person's mouth in dentally operative alignment and position, said teeth being rigidly supported and aligned by said frame.

* * * * *